Patented May 20, 1952

2,597,702

UNITED STATES PATENT OFFICE 2,597,702

FLUOROALKYLPHOSPHORIC COMPOUNDS

Anthony F. Benning, Woodstown, N. J., assignor to E. I. du Pont de Nemours and Company, Wilmington, Del., a corporation of Delaware No Drawing. Application June 29, 1950,
Serial No. 171,246

3 Claims. (Cl. 260—461)

This invention relates to a new class of fluorinated organic compounds and, more particularly, to certain fluoroalkylphosphoric esters and salts thereof.

Little is known of the fluoroalkylphosphoric esters. In particular, there is no description in the chemical literature of the fluoroalkylphosphoric esters having a multiplicity of difluoromethylene, —$CF_2$—, groups.

An object of the present invention is to provide a new class of fluorinated organic compounds of technological interest. A further object is to provide a class of fluoroalkylphosphoric esters and salts thereof characterized by their stability and value in various technological uses. A more particular object is to provide such a class of compounds which are excellent dispersing agents. Other objects will be apparent from the description of the invention given hereinafter.

The above objects are accomplished according to the present invention by providing a class of fluoroalkylphosphoric compounds having the formula $(H(CF_2)_{2n}CH_2O)_xPO(OM)_y$ wherein $n$ is an integer from 1 to 5, inclusive, $x$ is an integer from 1 to 3, inclusive, $y$ equals $3-x$, and M is hydrogen, alkali metal, ammonium, or substituted ammonium. Because of their unique value as dispersing agents the preferred compounds are the water soluble compounds having the above formula wherein $x$ is 1 or 2 and, still more preferred, are those compounds where M is the ammonium radical.

The starting materials for the preparation of the fluoroalkylphosphoric compounds of this invention are the corresponding fluoroalkanols of the formula $H(CF_2)_{2n}CH_2OH$ which can be prepared by polymerizing tetrafluoroethylene in the presence of methanol and of a peroxy or azo catalyst at 50° C. to 350° C. as described in U. S. application Serial No. 65,063, filed in the name of R. M. Joyce on December 13, 1948, now Patent No. 2,559,628, dated July 10, 1951. This reaction produces a mixture of the alcohols

where $n$ varies from 1 to 12 or more. This mixture can be used as obtained or it can be separated prior to conversion of the fluoroalkanols into the phosphate esters. The desired fluoroalkanols can be separated by conventional methods such as fractional distillation, crystallization and the like.

The fluoroalkanols used as starting materials for the preparation of the compounds of this invention are the members where $n$ is an integer from 1 to 5, inclusive, in the above formula and which can be prepared conveniently essentially according to Example IV of said application Serial No. 65,063, using ditertiarybutyl peroxide as the catalyst.

The fluoroalkylphosphoric compounds of this invention fall into the following three types:

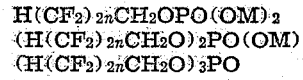

$n$ being an integer from 1 to 5, inclusive, and M being hydrogen, alkali metal, ammonium, or substituted ammonium.

A general synthesis for all these compounds is reaction of the appropriate fluoroalkanol with phosphorus oxychloride, $POCl_3$. This reaction is ordinarily carried out in the presence of pyridine as an HCl acceptor. The monoalkyl phosphates can also be prepared by treating phosphorus pentoxide, $P_2O_5$, with two mols of the appropriate fluoroalkanol, followed by hydrolysis of the resulting pyrophosphate. The product can then be isolated as such or, precipitated as the ammonium salt by the addition of ammonia to the reaction mixture. Alternatively, a solution of salts of the mixed mono- and di- esters can be prepared by neutralizing a mixture of the acids with aqueous ammonia, an amine or alkali metal hydroxide.

Likewise, the dialkyl phosphates can be prepared by reaction of two mols of the fluoroalkanol with one mol of phosphorus pentoxide. Instead of hydrolysis, however, the intermediate pyrophosphate is heated to 200°–300° C. at extremely low pressure. For the lower members of the series a pressure of 1–2 mm. is satisfactory but the higher ones require a considerably higher vacuum. For example, the pressure for the preparation of the eleven carbon atom member by this method must be about 0.01 mm. In any case, the overhead product consists of a mixture containing predominantly dialkyl acid phosphates with some regenerated alcohol and trialkyl phosphates.

An alternative method for preparing and separating a mixture of the mono- and dialkyl esters from the trialkyl derivatives is as follows: the appropriate fluoroalkanol (2–4 mols) is treated with one mol of phosphorus pentoxide at 80° C.– 180° C. The resulting mixed acid phosphate is neutralized with aqueous ammonia, an amine, tetraalkyl ammonium base, or alkali metal hydroxide to give a solution, or is dissolved in toluene and gassed with ammonia to precipitate a mixture of the salts of the corresponding mono- and difluoroalkyl phosphates. The toluene and unreacted fluoroalkanol and by-products such as the corresponding trialkyl phosphate are removed by filtration. By using three mols of the fluoroalkanol to one mol of phosphorus pentoxide a 1:1 mixture of mono- and dialkyl ester is obtained.

All of the monoalkyl acid phosphates, and also the corresponding mono- and di-ammonium salts, falling within the invention are white crystalline solids. The di-$C_3$ (three carbon atom) acid phosphate is liquid whereas the di-$C_{11}$ acid phosphate is a soapy white solid. Similarly, the trialkyl $C_3$ and $C_5$ compounds are liquid while the tri-$C_{11}$ is a white powder. These properties are summarized as follows:

|  |  | Melting Range | Boiling Point |
|---|---|---|---|
| $C_3$ | Monoalkyl acid | 65.0–68.0° C | |
|  | Di alkyl acid | below room temp | |
|  | Di alkyl NH$_4$ | 157–158° C | |
|  | Tri alkyl | | 63–64° C./0.04 mm. |
| $C_5$ | Di alkyl acid | | 200° C./5 mm. |
|  | Di alkyl NH$_4$ | 180–190° C | |
|  | Tri alkyl | | 161° C./7 mm. |
| $C_7$ | Mono alkyl acid | 111–112° C | |
| $C_9$ | do | 139–140° C | |
| $C_{11}$ | Mono alkyl acid | 168° C | |
|  | Di alkyl NH$_4$ | 185–190° C | |
|  | Tri alkyl | 115° C | |

The crude mixed acid phosphates vary in color from pink to dark brown. Their physical state varies from thick liquids for the lower members to brittle solids for the higher. The ammonium salts vary from white powders to soaps depending on the relative proportions of mono- and di-esters. The consistency of these various mixtures is not readily predictable apparently because several of the mixtures form low melting eutectics.

The compounds of this invention have been identified by analysis for phosphorus and/or nitrogen contents. A superior method for identification of the acid phosphates is potentiometric titration. The single atom of hydrogen of the dialkyl phosphates and the first hydrogen of the monoalkyl phosphates titrate in ethanol to give a plateau at pH 2–4. The second hydrogen of the monoalkyl phosphates shows a plateau at pH 8–10. From the relative lengths of these plateaus it is possible to identify the compounds and to determine their purity. Although titration of phosphoric acid itself produces the same two plateaus, this acid is easily detected by its low equivalent weight.

The following examples wherein all parts are by weight unless otherwise stated, illustrate the preparation of representative specific compounds of the present invention.

EXAMPLE I.—$C_3$ ESTERS

*Mono alkyl ester.*—To 132 parts of tetrafluoropropanol, $H(CF_2)_2CH_2OH$ (B. P. 74° C./200 mm.) there was added slowly 71 parts of phosphorus pentoxide with agitation at room temperature. The temperature was raised to 50° C. and 10 parts of water added. The resulting hydrolysis raised the temperature further to 90° C. Titration of the reaction mixture with 0.1 N NaOH showed that it contained 79% of monoalkyl phosphate and 21% of dialkyl phosphate.

The mono ester was isolated in the form of needle-like crystals by heating 50 parts of the above material in 1300 parts of toluene and allowing to stand for several hours. This crystalline material was found by titration in ethanol to have a neutral equivalent of 104. The theoretical value for mono(tetrafluoropropyl) phosphate is 106.

*Dialkyl ester.*—One hundred and thirty-two parts (1.0 mole) of tetrafluoropropanol was cooled to 0° C. With rapid agitation 71 parts of phosphorus pentoxide was added and the temperature rose to 112° C. The temperature was then raised to 160° C., held for 40 minutes, and then dropped to room temperature. The mixture was distilled, giving 157 parts of product in the form of a light gray-straw colored material boiling up to about 210° C./0.2 mm. Titration showed this to contain 127 parts of di(tetrafluoropropyl) phosphate, equivalent to a 78% yield based on the tetrafluoropropanol. This was converted to the ammonium salt by dissolving in toluene and treating with $NH_3$. The ammonium di(tetrafluoropropyl) phosphate was filtered, washed with petroleum ether and dried.

Analysis: Calculated for $$(H(CF_2)_2CH_2O)_2PO(ONH_4)$$

|  | Calculated | Found |
|---|---|---|
| Percent P | 9.04 | 9.56 |
| Percent N | 4.08 | 4.11 |

The ammonium salt underwent a transition from solid to liquid at 156.9° C.–158.2° C.

*Trialkyl ester.*—Sixty-six parts (0.49 mol) of tetrafluoropropanol, $H(CF_2)_2CH_2OH$, was charged into a reaction vessel with 45 parts of pyridine and 45 parts of dry benzene. At a rate designed to hold the temperature of the reaction mixture at 10° C., 26 parts of phosphorous oxychloride (0.17 mol) was added. The reaction mixture was refluxed for 2 hours after the addition of the phosphorus oxychloride, and pyridine hydrochloride precipitated. After the reaction mixture had cooled to room temperature, 85 parts of water was added. The benzene layer was separated, washed with water, and then dried and completely neutralized by treatment with solid sodium carbonate. After the removal of the benzene, the crude product was distilled at 0.04 mm., giving 31 parts boiling at 63° C.–64° C. The tri(tetrafluoropropanol) phosphate was a thin, light green liquid containing 7.12% P (theory 7.06%).

EXAMPLE II.—$C_5$ ESTERS

*Dialkyl ester.*—Sixty-seven parts of phosphrous pentoxide (0.471 mol) was rapidly added to 200 parts of octafluoroamyl alcohol, $$H(CF_2)_4CH_2OH$$

(0.863 mol), vigorously stirred, and cooled to approximately 5° C. After a period of 10–20 seconds, an exothermic reaction occurred which carried the temperature up to 60° C.–80° C. The cooling bath was then withdrawn and replaced by a heater and the reaction mixture was heated up to 190° C. over a period of 0.5 hour. This reaction mixture was then distilled over a range of 30° C–260° C./2–4 mm. The product of 194 parts of reddish-brown viscous liquid was a mixture of the octafluoroamyl alcohol and the various alkyl phosphates. It was dissolved in 860 parts of boiling toluene and gaseous ammonia bubbled in to give 154 parts (66% conversion) of ammonium di(octafluoroamyl) phosphate as a crystalline, white solid.

This same ester was also prepared from phosphorus oxychloride as follows: Into a refluxing mixture of 38 parts (0.25 mol) of phosphorus oxychloride and 0.5 part of pyridine there was added dropwise, 116 parts (0.50 mol) of octafluoroamyl alcohol. After the evolution of hydrogen chloride had ceased, the product was first crudely distilled and then fractionated to give two major fractions, the trialkylphosphate boiling at 161°/7 mm. and the dialkylphosphate boiling at 200°/5 mm. The dialkylphosphate was dissolved in 250 parts of boiling toluene and the ammonium salt precipitated in white, feathery crystals through the addition of dry, gaseous ammonia. The ammonium salt melted sharply at 190° C.

Analysis calculated for

$(H(CF_2)_4CH_2O)_2PO(ONH_4)$

P, 5.72; N, 2.58; neutralization equivalent, 543. Found: P, 5.83; N, 2.62; neutralization equivalent, 558.

When used in 0.5% concentration as a dispersant in the aqueous polymerization of tetrafluoroethylene, this salt produced a colloidal suspension containing 24% solid.

*Tri(octafluoroamyl)phosphate.*—A mixture of 64 parts (0.418 mol) of phosphorus oxychloride, 296 parts (1.28 mol) of octafluoroamyl alcohol and 0.5 parts of pyridine was refluxed until the evolution of hydrogen chloride had ceased. The product was washed twice with water, then dissolved in ether and dried over Drierite. On distillation the major fraction, 73 parts of tri-(octafluoroamy)phosphate (23.6% conversion) was obtained at 161°/7 mm. It was a clear, colorless, odorless, slightly viscous liquid with a specific gravity of approximately 1.6.

EXAMPLE III.—C7 ESTERS

*Ammonium dodecafluoroheptyl phosphate.*—One-tenth mol (33.2 parts) of dodecafluoroheptanol, $H(CF_2)_6CH_2OH$, B. P. 170–171° C., was mixed at room temperature with 0.05 mol (7.1 parts) of phosphorus pentoxide. The mixture warmed up slightly upon mixing and it was heated with stirring at about 50° C. for 30 minutes when it became slightly brownish. About 50 parts of distilled water was then added to hydrolyze the fluoroalkyl phosphoanhydrides and unreacted phosphorus pentoxide. The mixture was dissolved in dioxane and boiled for several minutes. Treatment with gaseous ammonia precipitated the ammonium fluoroalkyl phosphate. This material was dissolved in absolute ethanol and the insoluble ammonium phosphate was filtered off. The monoammonium dodecafluoroheptyl phosphate was precipitated from the ethanol solution by boiling off the ethanol with toluene. The yield was 60.5%.

Analysis calculated for $H(CF_2)_6CH_2OPO(OH)(ONH_4)$

P, 7.21; N, 3.26. Found: P, 7.41; N, 3.32.

*Mono(dodecafluoroheptyl)phosphate.* — One-half mol of dodecafluoroheptanol was mixed with 0.25 mol (36 parts) of phosphorus pentoxide in a stirred container. The temperature was kept at about 80° C. for 1 hour. The reaction is exothermic and the temperature was maintained at 80° C. for 20–30 minutes without external heating. After the addition of 25 parts of water the mixture was heated at 80° C. for 15 minutes. The slightly pink crude product was boiled with benzene to remove the water. At this stage the crude mixture was dissolved completely in about 1500 parts of boiling benzene and crystallized therefrom. The refined dodecafluoroheptyl phosphate was further purified by crystallization from toluene, giving a product which melted at 102° C.–107° C. with slight pink color. This was purified further by treating an ethyl ether solution of the compound with decolorizing carbon, filtering, evaporating and crystallizing carefully from a benzene-ether mixture containing a very small amount of ether. The final purified mono(dodecafluoroheptyl)phosphate, $H(CF_2)_6CH_2OPO(OH)_2$ M. P. 111° C.–112° C., had a neutral equivalent at 203±2 (theoretical 206).

EXAMPLE IV.—C9 ESTERS

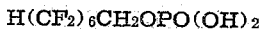

*Mixed phosphate esters of hexadecafluorononanol.*—To 50 parts of hexadecafluorononanol, $H(CF_2)_8CH_2OH$ (0.116 mol) were added 6 parts (0.04 mol) of phosphorus pentoxide. These ingredients were mixed intimately and heated to 120° C.–140° C. To five parts of the crude ester thus formed were added 2.5 parts of 28% aqueous ammonium hydroxide, followed by dilution to 100 parts with water. This gave a mixture of ammonium salts of hexadecafluorononyl phosphates.

*Diammonium hexadecafluorononyl phosphates.*—43.2 parts (0.10 mol) of hexadecafluorononanol were dissolved in 45 parts of toluene and 7.1 parts (0.05 mol) of phosphorus pentoxide added. The mixture was stirred at 60° C.–70° C. for 2.5 hours. Two parts of water were added and the mixture refluxed in order to hydrolyze the phosphoanhydrides formed. The mixture was dissolved in 500 parts of dioxane and treated twice with decolorizing carbon. Thereupon the mixture was gassed with ammonia to precipitate the diammonium hexadecafluorononyl phosphate which was dissolved in ethanol, boiled momentarily with benzene to remove water, and the insoluble ammonium filtered off. The diammonium hexadecafluorononyl phosphate was then precipitated by boiling off the ethanol with benzene. 25 parts of the diammonium salt was obtained. By diluting the dioxane solution with toluene an additional 11.5 parts of the diammonium salt was yielded, making the final yield 69%.

Analysis: percent P, 5.95, 5.93; percent N, 2.65.

EXAMPLE V.—C11 ESTERS

*Tri(eicosafluoroundecyl)phosphate.*—This ester was prepared in the manner described above in connection with the diammonium salt in Example IV but using 100 parts (0.188 mol) of eicosafluoroundecanol, $H(CF_2)_{10}CH_2OH$, 16 parts of pyridine, and 9.2 parts (0.06 mol) of phosphorus oxychloride in 85 parts of xylene. The ester formed was washed with water and crystallized from toluene and methanol, successively. This ester was a white powder with a melting range of 115.1° C.–115.5° C., and contained 2.09% P (theory 1.89% P).

*Ammonium di(eicosafluoroundecyl)phosphate.*—14 parts of phosphorus pentoxide were added to 106 parts of eicosafluoroundecanol at 100° C., the temperature raised to 200° C. and held there for 45 minutes, and then reduced to room temperature. The reaction mixture was then distilled over a range of 30° C.–280° C. at 0.003–0.008 mm. pressure. Titration of the distillate showed only one active hydrogen. It was dissolved in boiling toluene and gaseous ammonia bubbled into the solution, thus precipitating the ammonium salt of di(eicosafluoroundecyl)phosphate containing 3.46% P and 1.39% N. It changed from a solid to a liquid at 180° C.–

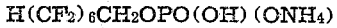

190° C. in a sealed tube and at 182.5° C.–190° C. in an open tube.

*Diammonium eicosafluoroundecyl phosphate.*—53.2 parts (0.10 mol) of eicosafluoroundecanol were dissolved in 45 parts of toluene at 70° C. and 7.1 parts (0.05 mol) of phosphorus pentoxide were added. The mixture was kept at 70° C., with stirring for one hour and refluxed for 30 minutes. Two parts of water were added to hydrolyze the reaction products and the entire mixture was then dissolved in dioxane. The dioxane solution was treated twice with decolorizing carbon and gassed with anhydrous ammonia. 28 parts of diammonium eicosafluoroundecyl phosphate were precipitated. This was dissolved in absolute ethanol and precipitated by boiling off ethanol with benzene. There was thus obtained a yield of 44.5% of the diammonium salt.

Analysis calculated for $$H(CF_2)_{10}CH_2OPO(ONH_4)_2$$

N, 4.33. Found: N, 4.39.

It will be understood that the above examples are merely illustrative and that the present invention broadly comprises the class of fluoroalkylphosphoric compounds having the formula $(H(CF_2)_{2n}CH_2O)_xPO(OM)_y$ wherein $n$ is an integer from 1 to 5, inclusive, $x$ is an integer from 1 to 3, inclusive, $y$ equals $3-x$, and M is hydrogen, alkali metal, ammonium or substituted ammonium.

In the manner disclosed hereinbefore and illustrated in the numerous examples, the other compounds of the defined class of this invention may be prepared. These compounds include both the fluoroalkylphosphoric esters and the salts of these esters with ammonia, the alkali metals such as potassium, sodium, and lithium, and amines, particularly the alkylamines of 1 to 6 carbon atoms such as ethylamine, diethylamine, butylamine, and hexylamine, and the tetraalkyl ammonium bases corresponding to these amines. Because of their special utility as dispersing agents, the ammonium and alkali metal salts are preferred, especially the ammonium salts of the mono- and difluoroalkylphosphoric esters.

The compounds of this invention are useful for a wide variety of purposes. Those having the requisite water solubility, which may be relatively very slight, are useful surface-active agents. They are particularly adapted as dispersing agents in the polymerization of haloolefines, where dispersions of the polymers are obtained with difficulty, if at all, from polymerization in aqueous medium in the presence of ordinary dispersing agents. Failures in this respect encountered in the polymerization of haloolefines, especially tetrafluoroethylene, are generally attributed to chain termination caused by conventional dispersing agents. Thus, the subject compounds are admirably suited for aqueous polymerization of tetrafluoroethylene and chlorotrifluoroethylene because of the inertness of their alkyl chains.

As many apparently widely different embodiments of this invention may be made without departing from the spirit and scope thereof, it is to be understood that the invention is not limited to the specific embodiments thereof except as defined in the appended claims.

The invention claimed is:

1. A fluoroalkylphosphoric compound having the formula $(H(CF_2)_{2n}CH_2O)_xPO(OM)_y$ wherein $n$ is an integer from 1 to 5, inclusive, $x$ is an integer from 1 to 3, inclusive, $y$ equals $3-x$, and M is from the group consisting of hydrogen, alkali metal, ammonium, and substituted ammonium.

2. A fluoroalkylphosphoric compound having the formula $(H(CF_2)_{2n}CH_2O)_xPO(ONH_4)_y$ wherein $n$ is an integer from 1 to 5, inclusive, $x$ is an integer from 1 to 3, inclusive, and $y$ equals $3-x$.

3. A fluoroalkylphosphoric compound as set forth in claim 2 wherein $x$ is an integer from 1 to 2, inclusive.

ANTHONY F. BENNING.

REFERENCES CITED

The following references are of record in the file of this patent:

UNITED STATES PATENTS

| Number | Name | Date |
| --- | --- | --- |
| 2,411,159 | Hanford | Nov. 19, 1946 |
| 2,451,375 | Bell | Oct. 12, 1948 |

OTHER REFERENCES

Swarts, Rec. Trav. Chim., vol. 28, pp. 166–170 (1909).